US 9,525,308 B1

United States Patent
Bullock et al.

(10) Patent No.: US 9,525,308 B1
(45) Date of Patent: Dec. 20, 2016

(54) EMERGENCY DOOR RELEASE WITH BACKUP POWER

(71) Applicant: Overhead Door Corporation, Lewisville, TX (US)

(72) Inventors: Mark Bullock, Wooster, OH (US); Brent Buescher, Jr., Wooster, OH (US)

(73) Assignee: Overhead Door Corporation, Lewisville, TX (US)

( * ) Notice: Subject to any disclaimer, the term of this patent is extended or adjusted under 35 U.S.C. 154(b) by 461 days.

(21) Appl. No.: 14/206,736

(22) Filed: Mar. 12, 2014

Related U.S. Application Data

(60) Provisional application No. 61/798,544, filed on Mar. 15, 2013.

(51) Int. Cl.
*H02J 9/06* (2006.01)
*A62C 2/24* (2006.01)

(52) U.S. Cl.
CPC .............. *H02J 9/061* (2013.01); *A62C 2/247* (2013.01); *E05Y 2201/414* (2013.01); *E05Y 2201/462* (2013.01); *E05Y 2400/612* (2013.01); *E05Y 2800/252* (2013.01); *Y10T 307/615* (2015.04); *Y10T 307/625* (2015.04)

(58) Field of Classification Search
CPC ..... Y10T 307/615; Y10T 307/625; H02J 9/06; H02J 9/061; H02J 2009/068; E05Y 2400/612; E05Y 2400/60; E05Y 2201/462; E05Y 2201/41; E05Y 2201/414; E05Y 2201/258; E05Y 2800/252; E05Y 2400/52; E05Y 2900/134; E05F 1/02; E05F 15/72; E05F 1/006; A62C 2/24; A62C 2/247
See application file for complete search history.

(56) References Cited

U.S. PATENT DOCUMENTS

| | | |
|---|---|---|
| 4,147,197 A | 4/1979 | Bailey et al. |
| 4,197,675 A | 4/1980 | Kelly |
| 4,365,250 A | 12/1982 | Matsuoka et al. |
| 4,995,651 A | 2/1991 | Wardlaw |
| 5,072,973 A | 12/1991 | Gudgel et al. |
| 5,082,316 A | 1/1992 | Wardlaw |
| 5,140,173 A | 8/1992 | Chau et al. |
| 5,144,153 A | 9/1992 | Scheppmann, II |
| 5,203,392 A | 4/1993 | Shea |
| 5,245,879 A | 9/1993 | McKeon |
| 5,253,693 A | 10/1993 | Marlatt et al. |

(Continued)

*Primary Examiner* — Ryan Johnson
(74) *Attorney, Agent, or Firm* — Gardere Wynne Sewell LLP

(57) ABSTRACT

The present disclosure provides an emergency door release operable to release or command-to-close a rolling emergency door from its uppermost, or open, position to its lowermost, or closed, position, in response to an emergency condition even when there is a loss of mains input power, while also avoiding releasing the door solely upon a loss of mains power. The emergency door release comprises an emergency detector for detecting an emergency condition, a microcontroller for closing/releasing the rolling door in response to the emergency condition, a backup power means for providing backup power to the microcontroller during a loss of mains power, and a door retention system for retaining the rolling door when powered, and releasing the door when power is removed from the door retention system.

21 Claims, 3 Drawing Sheets

(56) References Cited

U.S. PATENT DOCUMENTS

| | | |
|---|---|---|
| 5,261,186 A | 11/1993 | Saino |
| 5,263,527 A | 11/1993 | Marlatt et al. |
| 5,278,451 A | 1/1994 | Adachi et al. |
| 5,355,927 A | 10/1994 | McKeon |
| 5,386,891 A | 2/1995 | Shea |
| 5,482,103 A | 1/1996 | Burgess et al. |
| 5,554,433 A | 9/1996 | Perrone, Jr. et al. |
| 5,566,376 A | 10/1996 | Dye et al. |
| 5,576,581 A | 11/1996 | Iannuzzi et al. |
| 5,610,794 A | 3/1997 | Dye et al. |
| 5,673,514 A | 10/1997 | McKeon |
| 5,743,320 A | 4/1998 | McKeon |
| 5,812,391 A | 9/1998 | Mehalshick |
| 5,839,766 A | 11/1998 | Iannuzzi et al. |
| 5,850,865 A | 12/1998 | Hsieh |
| 5,893,234 A | 4/1999 | McKeon |
| 5,896,907 A | 4/1999 | Dever et al. |
| 6,014,307 A | 1/2000 | Crimmins |
| 6,049,287 A | 4/2000 | Yulkowski |
| 6,123,134 A | 9/2000 | Thomas et al. |
| 6,155,324 A | 12/2000 | Elliott et al. |
| 6,225,768 B1 | 5/2001 | Cookson et al. |
| 6,388,412 B1 | 5/2002 | Reed et al. |
| 6,484,784 B1 | 11/2002 | Weik, III et al. |
| 6,670,725 B2 | 12/2003 | Fitzgibbon et al. |
| 6,737,823 B2 | 5/2004 | Reed et al. |
| 6,894,613 B2 | 5/2005 | Stab |
| 6,920,718 B2 | 7/2005 | Hom et al. |
| 6,924,730 B1 | 8/2005 | Evans |
| 7,034,484 B2 | 4/2006 | Gioia et al. |
| 7,138,912 B2 | 11/2006 | Fitzgibbon et al. |
| 7,299,847 B1 | 11/2007 | Evans |
| 7,382,063 B2 * | 6/2008 | Mullet .................... E05F 15/00 307/64 |
| 7,574,826 B2 | 8/2009 | Evans |
| 7,591,102 B1 | 9/2009 | Evans |
| 8,493,033 B2 * | 7/2013 | Banta ...................... H02J 9/061 320/137 |
| 8,838,279 B2 * | 9/2014 | Blackwell .......... B65G 69/2882 340/687 |
| 2010/0156182 A1 * | 6/2010 | Mertel .................. E05F 15/668 307/66 |

\* cited by examiner

EMERGENCY DOOR RELEASE WITH BACKUP POWER

CROSS REFERENCE TO RELATED APPLICATIONS

This application claims the benefit of U.S. Provisional Patent Application Ser. No. 61/798,544 filed Mar. 15, 2013, and is hereby incorporated by reference in its entirety.

BACKGROUND

Technical Field

The present invention relates generally to emergency door release systems, more particularly to release systems for enabling the closure of doors to isolate the area in which the emergency condition exists, and even more particularly to emergency door releases operable to release a fire door to close off the area in which the fire is detected, notwithstanding loss of mains input power.

INTRODUCTION

It is often critical to close off an area of a building in which emergency conditions are detected, such as a fire or release of toxic fumes. For this purpose, emergency door systems have come on the market that include a release device that enables the door, typically a rolling door mounted on a horizontally extending axle, to be quickly lowered, to close off the area in which the fire or other emergency condition exists, in response to sensing the emergency condition. Since the release device must remain operable at least long enough during the emergency to enable door closure, and since emergency door release devices typically depend upon electric power, the loss of building mains power during the emergency poses a particular challenge.

One solution that has been proposed to overcome such challenge is to use an emergency release device that always releases the door whenever building mains power is lost. However, there are situations in which loss of building mains power may be caused by circumstances other than a fire or other emergency condition. In those situations, the release of the door when there is only a loss of building mains power may not only be undesirable, but hazardous. Therefore, what is required is to have an emergency door release that (i) in response to an emergency, like a fire, enables the door to close and shut off the area in which the fire or other emergency exists from the rest of the building, whether or not there is a loss of building mains power, (ii) but does not close the door upon loss of building mains power in the absence of an emergency requiring such closure.

SUMMARY

The present invention constitutes a new and improved version of an emergency door release device, operable in response to an emergency condition (e.g., a building fire) to enable a door that is normally open, typically a rolling door, to close and shut off the portion of the building in which the emergency condition exists. This closure occurs in response to the emergency, irrespective of whether or not there is a loss of building mains power, but not necessarily when there is only a loss of building mains power. The release device of the invention includes a non-chargeable power source (e.g., a non-chargeable battery) providing backup power to a microcontroller during loss of mains power, the microcontroller responding to the emergency condition to enable release of the door. A feature of the release device of the invention is that the source of power to the microcontroller is limited to that furnished (i) by a DC voltage regulator during the presence of mains input power, (ii) by the back-up non-chargeable battery when there is a loss of mains input power, and (iii) by a large holding capacitor that assures that the microcontroller stays powered long enough to effect the switch-over from mains input power to back-up power.

These and other features, as well as the advantages thereof, will become readily apparent from the following detailed description of a preferred embodiment of the invention, read in conjunction with the accompanying drawings, in which:

DETAILED DESCRIPTION

Figure 1:
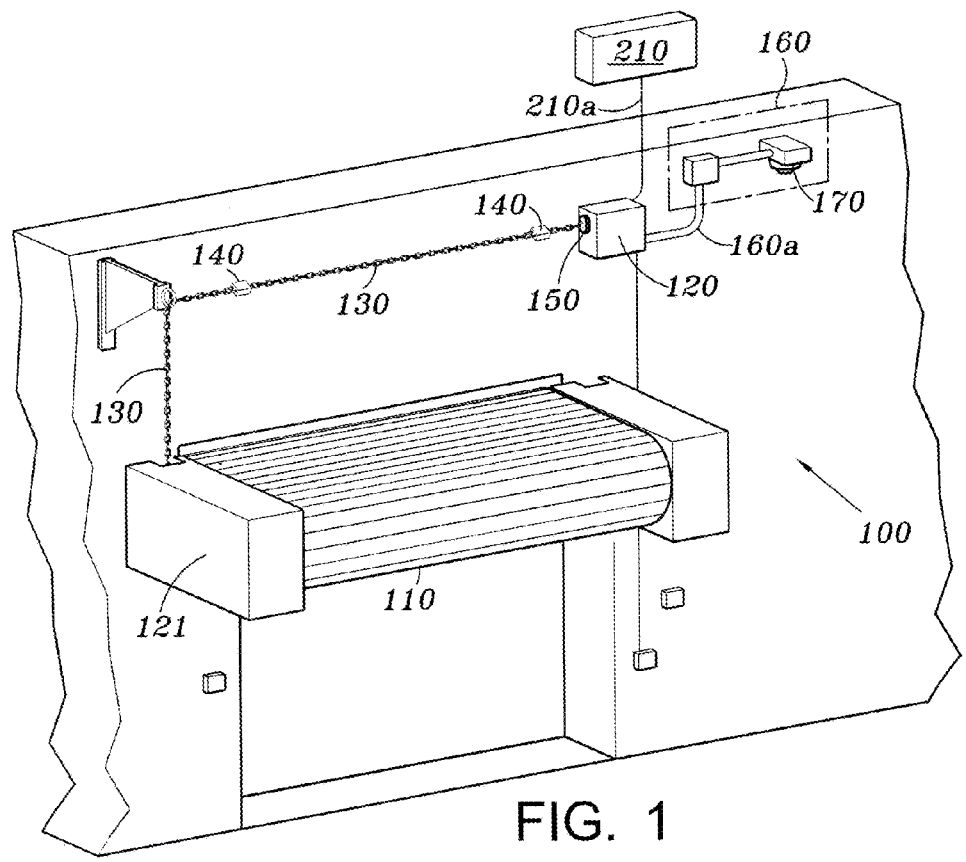
FIG. 1 illustrates the emergency door release device of the present invention incorporated in an emergency detection system for closing a building door.

In the description that follows, like parts are marked throughout the specification and drawings with the same reference numerals, respectively. The drawings are not necessarily to scale and certain features may be shown exaggerated in scale or in somewhat schematic form in the interest of clarity and conciseness.

Referring now to FIG. 1, an emergency detection system 100 is depicted for closing a door 110 in response to a building fire or other type of emergency. The door 110, which in this example is a rolling door, is typically raised and lowered by a conventional door operator (not shown) and contains an emergency door release device 120 operable to move a door retention assembly 121 between a retained position, to hold door 110 in its open position (as shown) in non-emergency conditions, and a released position, to release door 110 to facilitate movement of the door 110 to a closed position in response to an emergency or a mains power loss for an extended duration of time.

The emergency door release device 120 of the present invention employs an electromagnet 226 (FIG. 2) and is effective to position door retention mechanism 121 in the retained position, when electromagnet 226 is powered/energized (in the absence of a fire), and to position door retention assembly 121 in the released position, when the electromagnet 226 is disabled or otherwise not energized (during the presence of a fire or an extended duration mains power failure), to release and position the door retention assembly 121 in the released position.

Emergency door release device 120 incorporates a microprocessor 240 (FIG. 2) in wired or wireless communication along communication path 160a with a fire monitoring system 160, which comprises one or more fire detectors 170 (or any other type of detector for detecting an emergency conditions). In response to fire detector 170 sensing the presence of a fire, data is transmitted from fire monitoring system 160 to microprocessor 240 to enable microprocessor 240 to send a signal to close door 110. For example, in the event door 110 is operated by a conventional automatic door operator, microcontroller 240 sends a signal to the operator to move door 110 from the open position to the closed position to close off the area in which the fire condition exists. If however, no door operator is present or there is a mains power failure 210 which would prevent the door operator from moving the door 110, microcontroller 240 sends a signal to disable or otherwise de-energize electromagnet 226 to enable the door 110 to fall via gravity in the manner and for the purpose subsequently described. Fire monitoring system 160 may incorporate a building file alarm system that monitors fire conditions at one or more points within a building. Fire detector 170, for example, may be a conventional smoke detector, carbon monoxide detector, thermal sensor or any other type of device for monitoring fire or other emergency conditions.

Figure 2:
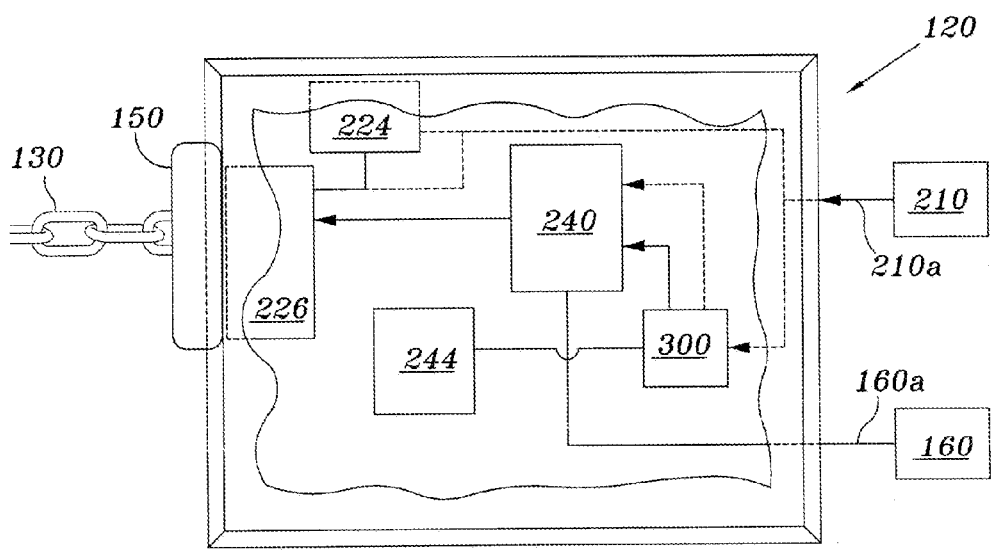
FIG. 2 illustrates a cutaway view, of a portion of the detection system of FIG. 1, in partial block diagram format.
Figure 3:
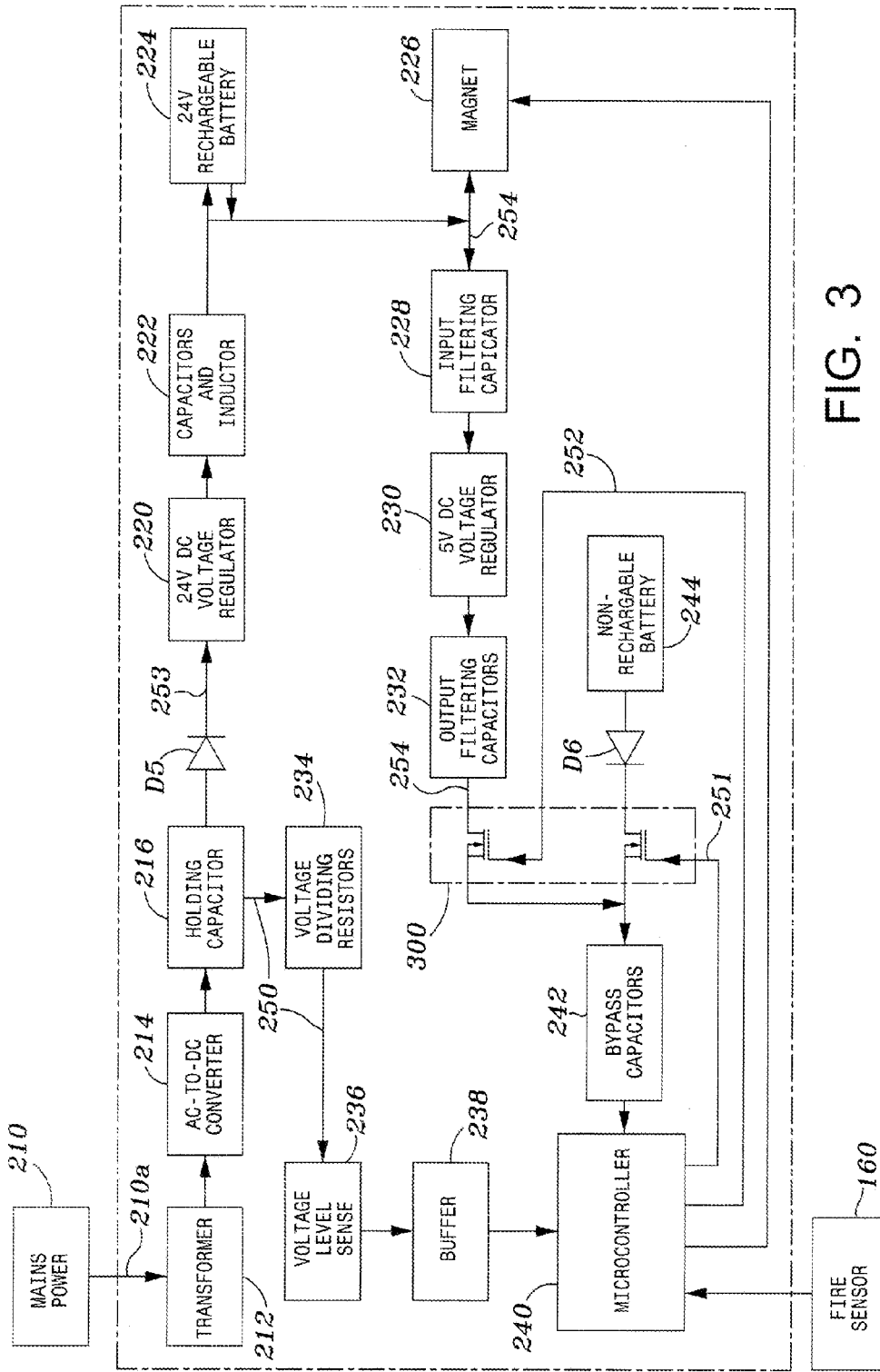
FIG. 3 illustrates one preferred embodiment of the emergency door release device, in accordance with the principles of the present invention, in full block diagram format.

Referring specifically to FIGS. 2 and 3, emergency door release device 120 is powered by building mains power 210 by way of cabling 210a. Mains power 210 is thereafter routed through a series of power conditioning components, as explained in further detail below, to a rechargeable battery 224, the electromagnet 226, and, through switching assembly 300, to provide regulated power to microprocessor 240. A standalone, non-rechargeable battery 244 is switchably connected via switching assembly 300 to provide power to microprocessor 240 upon a loss of mains power 210, as subsequently described in greater detail.

In accordance with one preferred embodiment of the present invention utilizing electromagnet 226 and with reference to FIGS. 1 and 2, a sash chain 130 extends from door retention assembly 121 and couples to door release device 120 via a magnetic attraction between electromagnet 226 and a metal plate 150, which is secured to the end of sash chain 130. During operation, so long as the electromagnet 226 remains energized, the plate 150 is held in tight contact with electromagnet 226 thereby maintaining sash chain 130 in a taut condition (as illustrated in FIG. 1). When in this configuration, door retention assembly 121 is maintained in its retained position to hold door 110 open. In the event mains power 210 is lost, rechargeable battery 224 provides backup power to electromagnet 226 to maintain operation/energization thereof in order to prevent the release of plate 150 and thus, movement of retention assembly to the released position causing closure of door 110. If during this time a fire or other emergency is detected, microprocessor 240 sends a signal to de-energize electromagnet 226 in order to release metal plate 150 from electromagnet 226, with the result that the sash chain 130 will collapse and/or otherwise lose tension. This loss of tension will cause door retention assembly 121 to move to its released position to facilitate the release of and closing of door 110 as a result of gravity. Referring specifically to FIG. 2, emergency detection system 100 incorporates one or more fusible links 140 on sash chain 130. Fusible links 140 provide an added or redundant method of closing if emergency door release device 110 becomes non-operational and/or any of the fusible links 140 are melted by the fire. For example, in the event a fusible link 140 is melted, sash chain 130 will split apart and lose tension resulting in the afore-described movement of the door retention assembly 121 to the released position to enable door 110 to close.

Alternate embodiments may also be employed that take advantage of the electromagnet 226. For example, electromagnet 226 and coupling 150 may be used and/or otherwise placed at any location along the length of sash chain 130. Alternatively, sash chain 130 may be completely dispensed within and electromagnet 226 interfaced directly with door retention assembly 121. Furthermore, according to some embodiments, emergency release device 120 can be operatively coupled to a door operator (not illustrated). In such cases, in the event of a power failure (and the operator remains operable via backup power or a separate power source), microcontroller 240 can issue door close command before the release of the electromagnet 226.

Referring specifically to FIG. 3, one preferred embodiment of the door release device 120 is employed to advantage. According to FIG. 3, building mains power 210 is directed to an AC transformer 212 to provide an initial step-down in voltage such that the voltage output at transformer 212 is reduced from 120 volts AC to approximately 28 volts AC. After the initial step-down in voltage, power is directed through an AC-to-DC converter 214 to convert the 28 volts AC power to approximately 28 volts DC power (or slightly less than 28 volts DC), and thereafter through a 24 volt DC voltage regulator 220. The output of regulator 220 provides a regulated 24V DC voltage to enable the charging of battery 224, which according to the embodiment disclosed in FIG. 3, is a 24V DC rechargeable battery. Preferably, rechargeable battery 224 comprises two 12 volt lead-acid batteries connected in series and having a 5 amp-hour rating. As described above, rechargeable battery 224 is operable to provide backup power to electromagnet 226 in the event of a loss of mains power 210, which prevents movement of plate 150 and thus, sash chain 130, from losing tension and causing door retention assembly 121 to be positioned in the released position (to facilitate the closing of door 110). The output power from regulator 220 is further conditioned via a step-down DC-to-DC power (voltage) regulator 230 to a regulated 5V DC value, which is applied through switching assembly 300 to microcontroller 240 in the manner subsequently described. Capacitors and inductors 222, input filtering capacitor 228, output filtering capacitors 232 and bypass capacitors 242 are utilized as necessary to provide traditional current smoothing functions to accommodate the slight fluctuations in power levels during operation.

In the event mains power 210 has failed, the standalone, non-rechargeable battery pack 244 is switched in, by way of switching assembly 300, to provide backup power to the microcontroller 240, thereby enabling the microcontroller 240 to continue to be available to respond to a fire or other emergency condition. According to a preferred embodiment, rechargeable battery pack 244 contains a pair of 3.6 volt AA cell batteries having a 2.4 amp-hour rating. Accordingly, microcontroller 240 remains powered at all times and operable to disable the electromagnet 226 in response to the emergency, which facilitates the closing of the door 110. Accordingly, if the mains power 210 is lost and there is no fire or other emergency that requires door closure, the emergency door release device 120 will remain operable to prevent the closing of door 110.

According to a preferred embodiment, switching assembly 300 includes two field effect transistors (MOSFETs) identified as MOSFET devices A and B. During the presence of mains power 210, MOSFET A is "open" and MOSFET B is in a "closed" configuration, thereby enabling the regulated 5V DC to power the microcontroller 240. While switching assembly 300 is in this configuration, release device 110 is configured in a normal power mode. In response to the loss of mains power 210, MOSFET switch A is closed and MOSFET switch B is opened, thereby enabling non-rechargeable battery 244 to power the microcontroller 240 in a backup power mode and electrically disconnect and isolate the source of mains power 210 and battery 224 from microcontroller 240. The switching of switching assembly 300 is under control of the microcontroller 240, which continuously monitors the presence or absence of mains power 210 by way of a separate "power sensing" path 250. In the embodiment illustrated in FIGS. 3 and 4, power sensing path 250 enables microcontroller 240 to monitor "unregulated" mains power 210 and includes voltage dividing resistors 234, voltage level sensing circuitry 236 and a buffer 238. In operation, microcontroller 240 monitors the presence or absence of a signal on this path 250, which respectively indicates the presence or absence of building mains power 210. For example, upon loss of this signal, thereby indicating loss of building mains power, the microcontroller 240 sends the appropriate "switching" instructions by way of lines 251 and 252 to close MOSFET switch A and open MOSFET switch B, thereby switching in non-rechargeable battery 244 for powering microcontroller 240 and isolating the source of mains power 210 and rechargeable battery 224. One or more diodes D6 are connected as shown in FIG. 3 to ensure that regulated DC power from paths 253 and 254 does not leak into the non-rechargeable battery 244.

For the efficient operation of the emergency door release 120, it is important (i) that the sole source of power to microcontroller 240 be limited to only that furnished by the voltage regulator 230 during the presence of mains power 210, or that furnished by the backup non-chargeable battery 244 when there is a loss of mains power 210, and (ii) that none of the energy storage devices in the network that are downstream of the voltage regulator 220 (i.e., devices 222, 224, 228, 232 and 242 discharge "backup power" to micro controller 240. To assure the latter condition, particularly because the switching between power supplied by regulator 230 to backup power supplied by non-rechargeable battery 244 may not be instantaneous, and as a feature of the door release device 120 of the present invention, a "holding" capacitor 216 is disposed upstream from voltage regulator 220. This capacitor 216 has a sufficiently large capacity, for example 820 microfarads, to ensure that when mains power 210 is lost, the consequent unregulated output discharge from capacitor 216 is sufficiently high to continuously power regulators 220 and 230 during the switchover from mains input power to backup power to provide the dual functions of (i) making certain that microcontroller 240 remains powered via the output of regulator 230 long enough so that, if necessary, the appropriate switching instructions can be sent by the microcontroller 240 to MOSFET switches A and B, and (ii) precluding other energy devices in the door release device 120, including the 24V rechargeable battery 224, and the energy storage devices 222, 228, 232, and 242, (and such other energy storage devices that there may be) from being able to leak power downstream to the microcontroller 240 during this transient switching operation. Thereafter, even if the output voltage from the holding capacitor 216 eventually drops to a level where these downstream energy storage devices would be capable of providing energy to the microcontroller 240, MOSFET B will have opened by that time, and these energy storage devices will be electrically isolated from the microcontroller 240. Additional isolation is provided by diode D5 and voltage regulator 220 to ensure that no regulated power can be leaked upstream to the microcontroller 240, for example through the power sensing path 250.

Other features may be incorporated in the door release 120 to ensure that the microcontroller 240 is powered, as described, and/or remains responsive to an emergency condition during the switchover to back-up power. For example, all bypass capacitors, including bypass capacitors 242, at the input to the microcontroller 240 may be designed never to have sufficient capacity to operate the microcontroller 240 even if a charge from these bypass capacitors 242 would leak into the microcontroller 240. Alternatively, the microcontroller 240 may be programmed with software that disables the microcontroller 240 from being able to respond to an emergency condition during the switch-over to the non-rechargeable battery 244 until at least the switchover has been completed.

Figure 4:
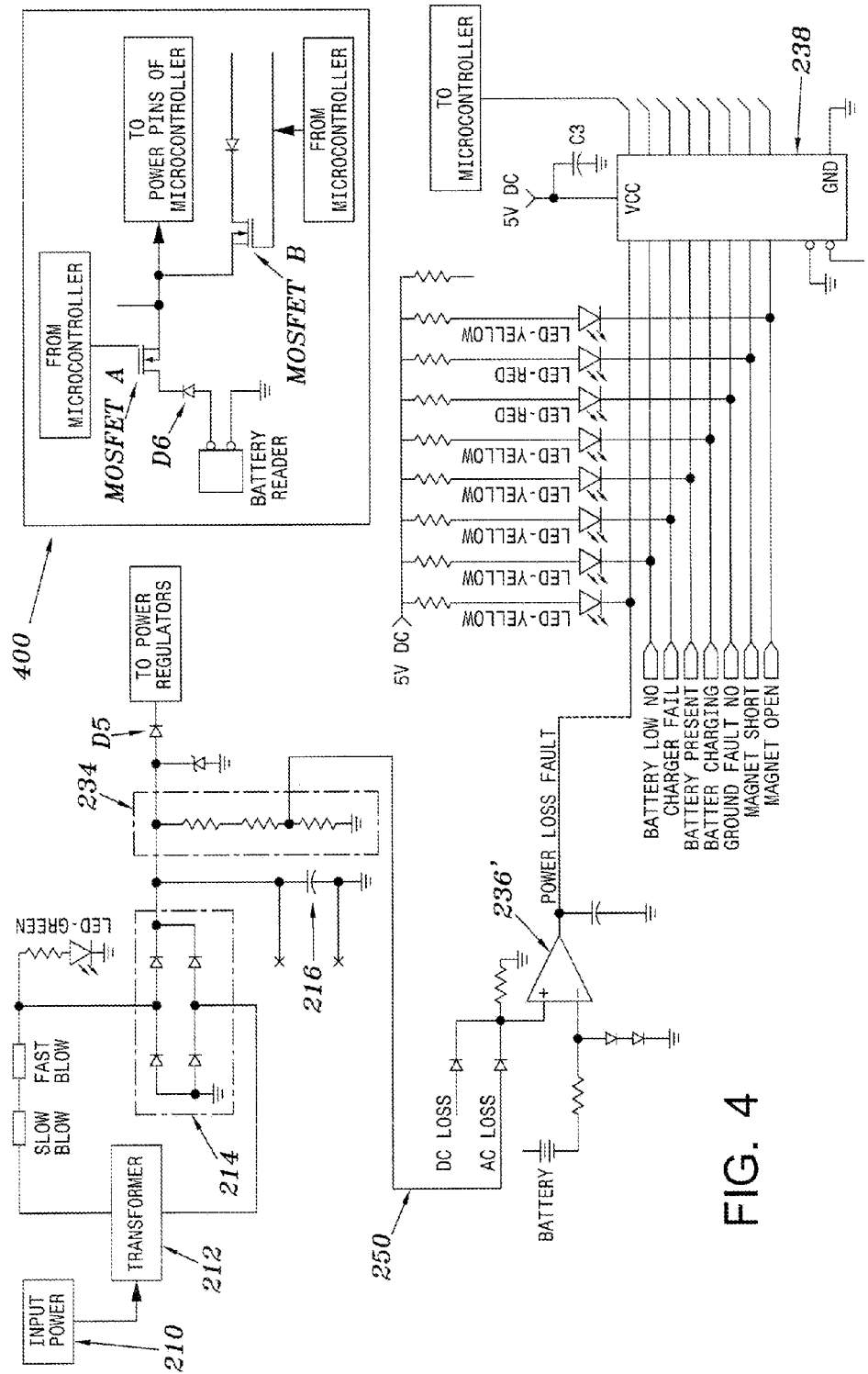
FIG. 4 illustrates exemplary circuit diagrams corresponding to portions of the block diagram schematic of FIG. 3.

FIG. 4 illustrates one preferred circuit configuration 400 in accordance with the block diagram schematic illustrated in FIG. 3. For example, in the embodiment illustrated in FIG. 4, AC-DC converter 214 comprises standard 3 amp 1000 volt rectifier diodes D1, D2, D3, and D4. Voltage dividing resistors 234 are depicted in FIG. 4 to include an 880 ohm resistor and two 3300 kilo ohm resisters. Power sensing path 250 extends from voltage dividing resisters 234 to voltage level sense device 236, which as illustrated in FIG. 4, preferably includes a comparator 236' for comparing voltage input levels. For example, comparator 236' compares the voltage level received from power sensing path 250 to a reference voltage, such as, for example, a reference voltage of 5 volts. The output from comparator 236' is stored within buffer 238, which is communicatively coupled to microcontroller 240. In operation, if the voltage level in power sensing path 250 is less than the reference voltage, the appropriate signal/state indicating a loss of mains power 210 is stored in buffer 238 for use by microcontroller 240. If the voltage level in power sensing path 250 is greater than the reference voltage, the signal indicating the presence of mains power is stored in buffer 238 for use by microcontroller 240.

It should be understood by those of ordinary skill in the art that the exemplary circuit diagrams 400 comprise one example of implementing the block diagram schematic. Accordingly, various adaptations may be provided without departing from the scope and spirit of the disclosure as set forth and defined solely by the claims.

What is claimed is:

1. A door release device, comprising:
   a microcontroller for controlling operation of the door release device, the microcontroller operable in a normal power mode, in which the microcontroller is powered by mains building power, and a backup power mode, in which the microcontroller is powered by a non-rechargeable backup battery;
   a switching assembly communicatively coupled to the microcontroller, the switching assembly operable to switch the microcontroller between the normal power mode and the backup power mode; and
   wherein in response to a detection of a mains power failure, the microcontroller configures the switching assembly to facilitate switching from the normal power mode to the backup power mode to enable the microcontroller to remain operational during the mains power failure.

2. The door release device of claim 1, wherein the switching assembly comprises a first and second field effect transistor.

3. The door release device of claim 1, wherein the configuring of the switching assembly to facilitate switching from the normal power mode to the backup power mode comprises closing a first switching device to connect the non-rechargeable battery to the microcontroller and opening a second switching device to disconnect the microcontroller from the mains power source.

4. The door release device of claim 3, wherein the first and second switching device comprise first and second field effect transistors.

5. The door release device of claim 1, further comprising a power sensing path extending between the mains building power and the microcontroller to enable the microcontroller to monitor the presence of mains building power.

6. The door release device of claim 1, further comprising a magnet, when powered, operable to maintain a barrier in an open position.

7. The door release device of claim 6, further comprising a rechargeable battery operable to provide backup power to the magnet in response to a failure of mains building power.

8. The door release device of claim 7, wherein the switching assembly is operable to isolate the rechargeable battery from the microcontroller in response to loss of mains power.

9. The door release device of claim 1, further comprising a holding capacitor for providing unregulated power to facilitate the powering of the door release device to enable the switching assembly to switch between the normal power mode and the backup power mode.

10. A method for controlling operation of a rolling door in an emergency door release device, the method comprising:
   utilizing mains building power to charge a rechargeable battery, power a microcontroller and energize an electro-magnet, the electromagnet operable to maintain the rolling door in an open position;
   monitoring, by the microcontroller, an emergency condition and the presence of mains building power;
   in response to loss of mains power,
      powering the electro-magnet with the rechargeable battery; and
      configuring a switching assembly to provide backup-power to the microcontroller from a non-rechargeable backup battery and to isolate the rechargeable battery from the microcontroller; and
   in response to the detection of an emergency, sending a signal from the microcontroller to de-energize the electromagnet to release the door and facilitate movement of the door from the open position to a closed position.

11. The method of claim 10, wherein configuring the switching assembly to provide backup power to the microcontroller further comprises closing a first switching device to connect the non-rechargeable battery to the microcontroller and opening a second switching device to disconnect the microcontroller from the mains power source and rechargeable battery.

12. The method of claim 10, wherein configuring the switching assembly to provide backup power to the microcontroller further comprises closing a first field effect transistor to connect the non-rechargeable battery to the microcontroller and opening a second field effect transistor to disconnect the microcontroller from the mains power source and rechargeable battery.

13. The method of claim 10, wherein the monitoring of the presence of mains power, comprises monitoring the presence of unregulated mains power.

14. The method of claim 10, further comprising regulating the mains building power to charge the rechargeable battery, power the microcontroller and energize the electro-magnet.

15. The method of claim 10, further comprising providing an energy storage device to store unregulated power and release the unregulated power to the emergency door release device in response to the loss of mains building power.

16. An emergency door release device, comprising:
   a microcontroller for controlling operation of the door release device, the microcontroller operable in a normal power mode, in which the microcontroller is powered by regulated mains building power, and a backup power mode, in which the microcontroller is powered by a non-rechargeable backup battery;
   a power sensing path for providing unregulated mains building power to enable the microcontroller to sense the presence of mains building power;
   a switching assembly communicatively coupled to the microcontroller, the switching assembly having first and second switching mechanisms to switch the microcontroller between the normal power mode and the backup power mode; and
   wherein in response to a detection of a mains power failure, the microcontroller configures the switching assembly to facilitate switching from the normal power mode to the backup power mode to enable the microcontroller to remain operational during the mains power failure.

17. The release device of claim 16, further comprising a voltage regulator for receiving unregulated mains power and converting to regulated mains power for charging the rechargeable battery and powering the microcontroller.

18. The release device of claim 16, wherein the switching mechanisms comprise first and second field effect transistors.

19. The release device of claim 16, further comprising a power storage device for storing unregulated mains power.

20. A door release device, comprising:
   a microcontroller for controlling operation of the door release device, the micro controller operable in a normal power mode, in which the microcontroller is powered by mains building power, and a backup power mode, in which the microcontroller is powered by a non-rechargeable backup battery;
   a voltage regulator for providing regulated power to the microcontroller;
   a switching assembly communicatively coupled to the microcontroller, the switching assembly operable to switch the microcontroller between the normal power mode and the backup power mode in response to a mains power failure; and
   a holding capacitor to provide unregulated power to continuously power the voltage regulator after the mains power failure to enable the switching assembly to switch the microcontroller from the normal power mode to the backup power mode.

21. The door release device of claim 20, wherein the holding capacitor comprises an 820 microfarad capacitor.

* * * * *